(12) United States Patent
Bouda

(10) Patent No.: US 7,046,880 B2
(45) Date of Patent: May 16, 2006

(54) OPTICAL COUPLING ELEMENT AND OPTICAL DEVICE

(75) Inventor: Martin Bouda, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 10/376,317

(22) Filed: Mar. 3, 2003

(65) Prior Publication Data

US 2003/0165296 A1   Sep. 4, 2003

(30) Foreign Application Priority Data

Mar. 4, 2002   (JP)   .............................. 2002-057301

(51) Int. Cl.
 G02B 6/26   (2006.01)
(52) U.S. Cl. ........................... 385/43; 385/39; 385/129
(58) Field of Classification Search .................. 385/39, 385/46, 129
 See application file for complete search history.

(56) References Cited

U.S. PATENT DOCUMENTS

| 5,737,352 A | 4/1998 | Tiemeijer et al. .............. 372/45 |
| 6,229,947 B1* | 5/2001 | Vawter et al. ............... 385/132 |
| 6,415,087 B1* | 7/2002 | Yang et al. .................. 385/123 |

FOREIGN PATENT DOCUMENTS

| GB | 2 326 020 | 12/1998 |
| JP | 5-27130 | 2/1993 |
| JP | 07-020359 | 1/1995 |
| WO | WO 99 66613 A | 12/1999 |

OTHER PUBLICATIONS

European Search Report dated Jul. 7, 2003.
Marshall I W: "Low Loss Coupling Between Semiconductor Lasers and Single-Mode Fibre Using Tapered Lensed Fibres" British Telecom Technology Journal, London, GB, vol. 4, No. 2, Apr. 1, 1986, pp. 114-121, XP000539960 *figure 2* p. 114, col. 1, line 34-page 114, col. 2, line 2.
Galarza M et al: "Modeling of InGaAsP-InP 1.55 micrometer lasers with integrated mode expanders using fiber-matched leaky waveguides" Applied Physics. B, Lasers and Optics, Springer, Berlin,, DE, vol. 73, 2001, pp. 585-588, XP002209793 ISSN: 0946-2171 * figure 3*figure 4*.
De Mesel K et al: "First demonstration of 980 nm oxide confined laser with integrated spot size converter" Electronics Letters, Jun. 8, 2000, IEE, UK, vol. 36, No. 12, pp. 1028-1029, XP 002244226 ISSN: 0013-5194 *figure 2*.

* cited by examiner

*Primary Examiner*—Sung Pak
(74) *Attorney, Agent, or Firm*—Armstrong, Kratz, Quintos, Hanson & Brooks, LLP

(57) ABSTRACT

An optical coupling element for optically coupling an optical element formed on a substrate to an external optical element disposed adjacent to the substrate, including a first optical waveguide section formed on the substrate and having a smaller width on the side of the external optical element than a width on the side of the optical element, and a second optical waveguide section formed on the substrate and connected to the first optical waveguide section on the side of the external optical element, and having a smaller width on the side of the external optical element than a width on the side of the optical element and having a shorter length than a length corresponding to twenty wavelengths of the optical signal. The optical waveguide section can optimize the optical coupling efficiency, and the optical waveguide section can suppress residual reflections.

16 Claims, 9 Drawing Sheets

OPTICAL COUPLING ELEMENT AND OPTICAL DEVICE

CROSS-REFERENCE TO RELATED APPLICATIONS

This application is based upon and claims the benefit of priority from the prior Japanese Patent Application No. 2002-057301, filed in Mar. 4, 2002, the entire contents of which are incorporated herein by reference.

BACKGROUND OF THE INVENTION

1. Field of the Invention

The present invention relates to an optical coupling element and an optical device, more specifically an optical coupling element which can effectively prevent residual reflection without sacrificing optical coupling efficiency, and an optical device comprising the optical coupling element.

2. Description of the Related Art

It is known that internal residual reflections of optical power in optical devices are a factor degrading device performance. For example, in laser oscillators, when residual reflection light returns into the oscillator, the residual reflection light disturbs oscillation states, which is a factor increasing noise components. A method to suppress the generation of the residual reflection light in the optical coupling elements is very important.

Usually the most important source of reflections is the device structure to couple optical power in and out of the chip on which the optical device or the optical integrated circuit is located. These structures have regions where the optical devices contacts the atmosphere, and due to a large refractive index difference between material forming the optical device and air, optical power is reflected at the interface therebetween to become residual reflection light.

Conventionally, methods for preventing the residual reflection, the following methods, for example, are proposed.

In a first method, an anti-reflection film is formed on the chip facet. This method can reduce the reflectivity of the chip facet.

In a second method, the optical waveguide is tilted by a prescribed angle (e.g., about 7°) relative to a normal vector on the chip facet. This method can decrease the amount of light reflected at the chip facet and coupled back into the optical waveguide.

In a third method, the width of the optical waveguide is tapered toward the output end. This method widens the effective optical field distribution at the chip facet, whereby the amount of light reflected at the chip facet and coupled back into the optical waveguide can be decreased, and also the optical field-width of the optical power can be easily matched with the optical field-width of the optical propagation element optically coupled to the output end of the optical waveguide.

In a fourth method, a so-called window structure is used. A window structure is a structure in which the end of the optical waveguide is spaced from the chip facet. In cases using the window structure, the optical field width of the optical power outputted from the end of the optical waveguide increases gradually in the direction of propagation of the optical power. Accordingly, this method can reduce the amount of light reflected at the chip facet and coupled back into the optical waveguide can be decreased.

These methods are used separately, or in combinations of two or more.

FIG. 9A is a top view of the structure of an optical coupling element using the second to the fourth methods described above. That is, in the optical coupling element of FIG. 9A, the optical waveguide 100 is tapered so as to have a smaller width at the output end surface 104 than at the input end surface 102, a window region is provided between the output end surface 104 and the chip facet 110, and the optical waveguide 100 is arranged so that a propagation direction of the optical power on the chip has a prescribed tilt angle to a normal vector on the chip facet 110. The optical coupling element of FIG. 9A can effectively prevent reflection light, reflected at the chip facet 110, from returning into the optical waveguide 100.

On the other hand, in the optical coupling element, it is very important not only to prevent residual reflection near the chip facet but also increasing optical coupling efficiency between the optical waveguide formed on the chip and external optical element, such as optical fibers, etc. formed outside the chip. To this end, an end configuration of the end of the optical waveguide, e.g., the length of the tapered region and the width of the end surface are optimized by simulation tools so as to obtain good optical coupling efficiency.

The optical coupling element shown in FIG. 9A has a structure which is very effective to prevent reflection light from the chip facet 110 from returning into the optical waveguide 100. However, it cannot be said that the structure is sufficient for suppressing residual reflection. That is, as shown in FIG. 9B, reflection light is generated at the output end surface of the optical waveguide 100 inside the chip, but the optical coupling element shown in FIG. 9A does not address the reflection at the output end surface 104 of the optical waveguide 100 and cannot suppress the generation of the residual reflection light due to this reflection at the output end surface 104.

In order to suppress the reflection at the output end surface of the optical waveguide, it is considered to taper the optical waveguide so that the optical waveguide has a zero-width at the end surface of the optical waveguide. However, an optimum value of the optical coupling efficiency can be obtained in a tapered structure, in which the end surface has a prescribed non-zero width. Accordingly, the tapered structure, in which the end surface of an optical waveguide has a zero-width, has lower optical coupling efficiency in comparison with the tapered structure, in which the end surface has a prescribed non-zero width. In terms of fabrication, it is very difficult to form with good reproducibility the optical waveguide having a zero-width end surface and the end thereof accurately aligned.

SUMMARY OF THE INVENTION

An object of the present invention is to provide an optical coupling element which can effectively prevent residual reflection without sacrificing optical coupling efficiencies, and an optical device comprising one or more optical coupling elements.

According to one aspect of the present invention, there is provided an optical coupling element for optically coupling an optical element formed on a substrate to an external optical element disposed adjacent to the substrate, comprising: a first optical waveguide formed on the substrate and having a width on a side of the external optical element smaller than a width on a side of the optical element; and a second optical waveguide formed on the substrate and connected to the first optical waveguide on the side of the external optical element, and having a width on a side of the external optical element smaller than a width on a side of the optical element, and having a shorter length than a length corresponding to 20 wavelengths of an optical signal.

According to another aspect of the present invention, there is provided an optical device comprising: an optical amplifier formed on a substrate; and an optical coupling element formed on the substrate and optically connected to one end of the optical amplifier, the optical coupling element including: a first optical waveguide connected at one end surface to the optical amplifier, and having a width on the other end surface smaller than a width on said one surface; and a second optical waveguide connected one end surface to said one end surface of the first optical waveguide, having a width on the other end surface smaller than a width on said one end surface, and having a shorter length than a length corresponding to 20 wavelengths of an optical signal.

According to further another aspect of the present invention, there is provided an optical device comprising: an optical amplifier formed on a substrate; a first optical coupling element formed on the substrate and optically connected to one end of the optical amplifier; and a second optical coupling element formed on the substrate and optically connected to another end of the optical amplifier, each of the first optical coupling element and the second optical coupling element including: a first optical waveguide connected at one end surface to the optical amplifier, and having a width on the other end surface smaller than a width on said one surface; and a second optical waveguide connected one end surface to said one end surface of the first optical waveguide, having a width on the other end surface smaller than a width on said one end surface, and having a shorter length than a length corresponding to 20 wavelengths of an optical signal.

According to further anther aspect of the present invention, there is provided an optical device comprising: an optical amplifier formed on a substrate; an optical coupling element formed on the substrate and optically connected to the optical amplifier, and an external optical element disposed adjacent to the substrate and optically connected to the optical coupling element, the optical coupling element including: a first optical waveguide having a width on a side of the external optical element smaller than a width on a side of the optical amplifier; and a second optical waveguide connected to the first optical waveguide on the side of the external optical element, and having a width on a side of the external optical element smaller than a width on a side of the optical amplifier and having a shorter length than a length corresponding to 20 wavelengths of an optical signal.

According to further another aspect of the present invention, there is provided an optical device comprising: an optical amplifier formed on a substrate; a first optical coupling element formed on the substrate and optically connected to one end of the optical amplifier; a second optical coupling element formed on the substrate and optically connected to another end of the optical amplifier; a first external optical element disposed adjacent to the substrate and optically connected to the first optical coupling element; and a second external optical element disposed adjacent to the substrate and optically connected to the second optical coupling element, each of the first optical coupling element and the second optical coupling element including: a first optical waveguide having a width on a side of the external optical element smaller than a width on a side of the optical amplifier; and a second optical waveguide connected to the first optical waveguide on the side of the external optical element, and having a width on a side of the external optical element smaller than a width on a side of the optical amplifier and having a shorter length than a length corresponding to 20 wavelengths of an optical signal.

As described above, according to the present invention, the optical waveguide optically connected to an optical device includes a basic part, and a frontmost end-part, having tapers different from each other, so that the basic part increases optical coupling efficiency, and the frontmost end-part suppresses the residual reflection, whereby the effective suppression of the residual reflection and the optimization of the optical coupling efficiency can be concurrently realized.

DETAILED DESCRIPTION OF THE PREFERRED EMBODIMENTS

A First Embodiment

The optical coupling element according to a first embodiment of the present invention will be explained with reference to FIGS. 1A–1B, 2A–2B and 3A–3C.

Figure 1A:
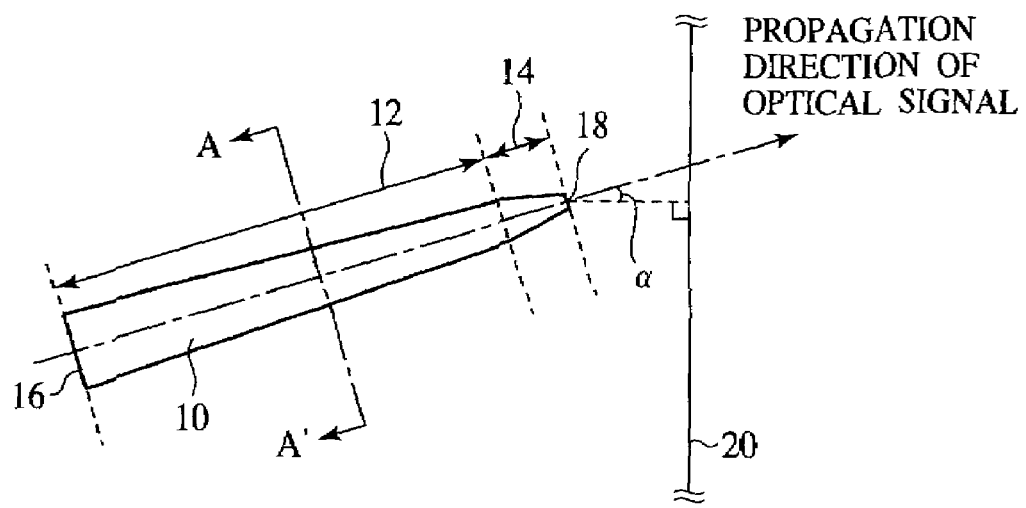
FIG. 1A is a top view of the optical coupling element according to a first embodiment of the present invention, which shows a structure thereof.
Figure 1B:
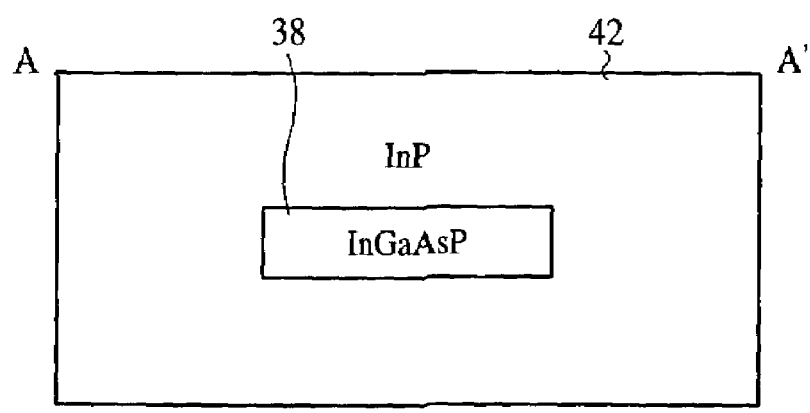
FIG. 1B is a diagrammatic cross-sectional view of the optical coupling element according to the first embodiment of the present invention, which shows a structure thereof.
Figure 2A:
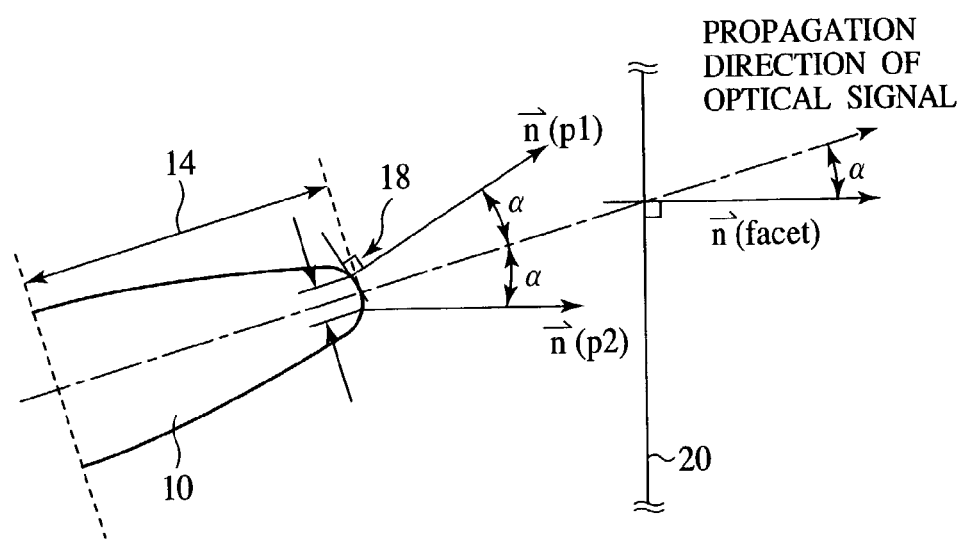
FIGS. 2A and 2B are top views of the optical coupling element according to modifications of the first embodiment of the present invention, which show a structure thereof.
Figure 2B:
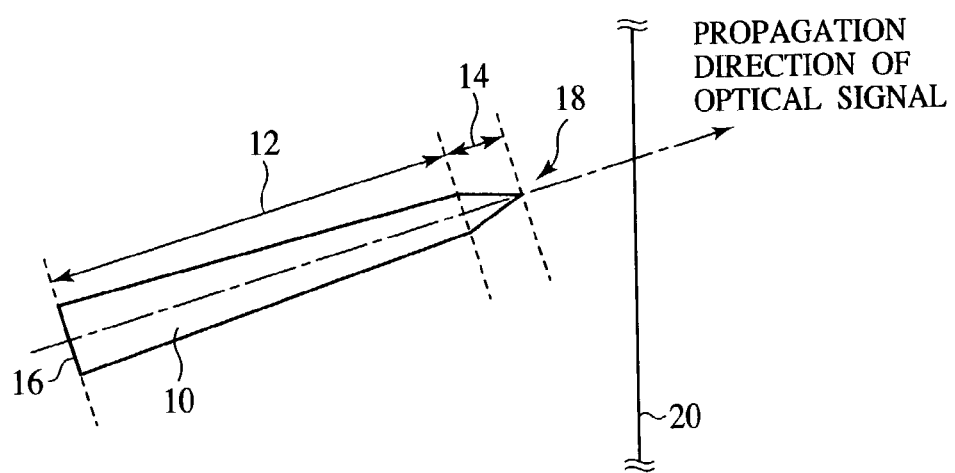
Figure 3A:
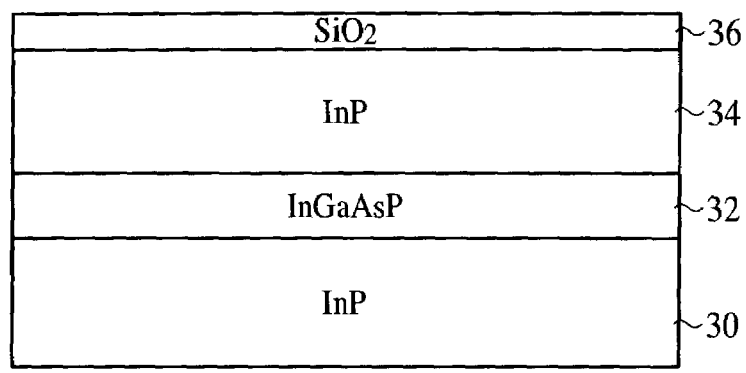
FIGS. 3A–3C are cross-sectional views of the optical coupling element according to the first embodiment of the present invention in the steps of the method for fabricating the same, which show the method.
Figure 3B:
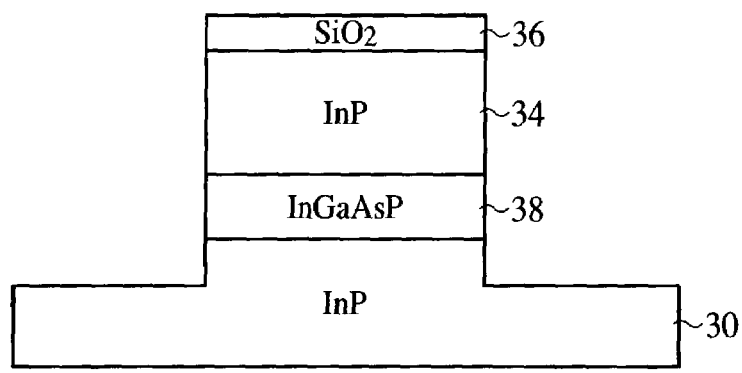
Figure 3C:
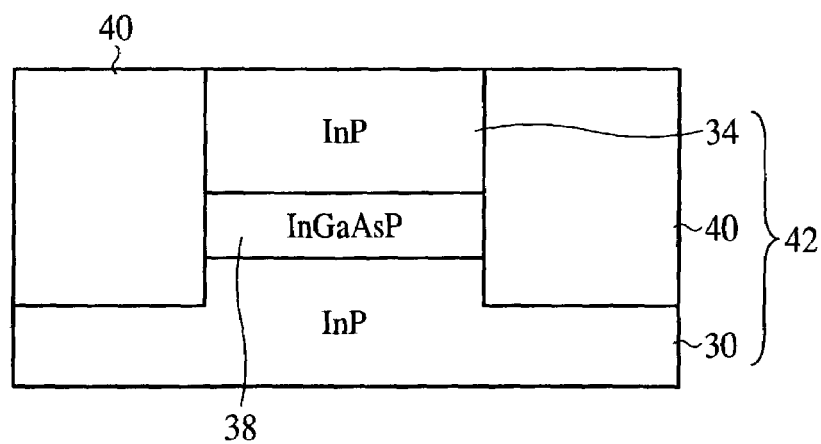

FIGS. 1A and 1B show a structure of the optical coupling element according to a first embodiment of the present invention. FIGS. 2A and 2B are top views of the optical coupling element according to modifications of the present embodiment, which show a structure thereof. FIGS. 3A–3C are cross-sectional views of the optical coupling element according to the present embodiment in the steps of the method of fabricating the same, which show the method.

First, the structure of the optical coupling element according to the present embodiment will be explained with reference to FIGS. 1A–1B and 2A–2B. FIG. 1A is a top view of the optical coupling element according to the present embodiment, and FIG. 1B is a diagrammatic cross-sectional view along the line A–A' in FIG. 1A.

An optical waveguide 10 for transmitting an optical signal is disposed so that a propagation direction of the optical signal is titled by an angle α (e.g., 7° or 10°) to a normal direction of the chip facet 20. The end surface 18 of the optical waveguide 10 is disposed, spaced by a prescribed distance from the chip facet 20, forming a so-called window structure. Next to the chip facet 20, an external optical element (not shown), such as an optical fiber, optical waveguide, optical lens, optical detector, or other optical device for accepting, transmitting, reflecting, and/or processing the optical signal outputted from optical waveguide 10, or an external optical element (not shown), such as an optical amplifier or other light-generating or amplifying element of which the light is optically coupled to optical waveguide 10, is to be provided.

To the end surface 16 of the waveguide 10, one or more optical devices (not shown), such as semiconductor optical amplifiers, semiconductor lasers are to be coupled optically. Optical waveguide 10 can be formed by extending an active layer of such optically coupled devices.

As shown in FIG. 1A, the optical waveguide 10 has a tapered configuration having a width which is decreasing towards the facet 20. For explanation, the optical waveguide 10 is divided as shown in FIG. 1A in a basic part 12 and a frontmost end-part 14. The taper of the frontmost end-part 14 is steeper than that of the basic part 12. As shown in FIG. 1B, the optical waveguide 10 comprises a core layer 38 formed of, e.g., InGaAsP, and a clad layer 42 of InP enclosing the core layer 38.

As described above, the optical coupling element according to the present embodiment is characterized mainly by the optical waveguide 10 being tapered in two stages. The respective tapered regions have the following respective functions.

The taper of the basic part 12 of the optical waveguide 10 is for controlling or improving the optical coupling efficiency to an external optical element. To increase the optical coupling efficiency between the external optical element optically connected to optical waveguide 10 through the waveguide end surface 18 of said optical waveguide 10, it is necessary to approximate as closely as possible the optical spatial field characteristics at a predetermined surface, depending on the nature of the optical characteristics of the external optical element, typically between an optical field transmitting structure and an optical field receiving structure. Typically the approximation can be described as the matching of the widths of two optical fields.

On the other hand, the width of the waveguide end surface 16 of optical waveguide 10, through which a device such as a semiconductor laser, or a different optical device is optically connected, is determined by the geometrical design of that particular device, obtained from an optical device design procedure to satisfy a predetermined set of functional and optical performance requirements. That is, the taper is for decreasing a width of the optical waveguide 10, which is resulting from the design of the optically coupled device, to a width which results in a generation of a preferred optical spatial field width in a predetermined plane, permitting efficient optical coupling between waveguide 10 and an external optical element.

The taper of the frontmost end-part 14 of the optical waveguide 10 is for suppressing the residual reflection due to end surface 18. The taper of the frontmost end-part 14 must reduce the residual reflection without affecting a desired optical field distribution provided by the basic part 12. In the optical coupling element according to the present embodiment, a sufficiently steep taper is provided in the frontmost end-part 14 in comparison with the taper of the basic part 12. To be specific, a tapered region which is shorter than a length corresponding to 20 wavelengths of the optical signal and has a width of the end surface 18 of the frontmost end-part 14 smaller than half the width of the side thereof which is in contact with the basic part 12. The length of the frontmost end-part 14 is shorter than a length corresponding to 20 wavelengths of the optical signal, whereby the frontmost end-part 14 does not modify the field profile of the optical signal significantly.

Such a short taper little affects the optical field distribution of the optical signal, and substantially no change in optical coupling efficiency is caused by passing through the frontmost end-part 14. The area of the end surface 18 can be much decreased, whereby light reflected on the end surface 18 to return to the optical waveguide 10 can be decreased.

The end surface 18 is not necessarily flat. As exemplified in FIG. 2A, the end surface 18 can be rounded. In this case, a width of the end surface 18 can be defined as follows. That is, as shown in FIG. 2A, a width of the end surface 18 is defined as the length of a path over end surface 18 between positions p1 and p2 on said surface, where a uniform angle α is formed concurrently between a normal vector n(facet) of the chip facet 20 and a normal vector n(p1) at position p1, a normal vector n(p2) at position p2, and a vector corresponding to the direction of propagation of an optical signal. When this width and a width of the side of the frontmost end-part 14 which is in contact with the basic part 12 satisfy above-described relationship, the effect of the present invention can be produced.

Otherwise, as exemplified in FIG. 2B, a width of the end surface 18 of the frontmost end-part 14 is infinitesimally small, i.e., the frontmost end-part 14 may have a triangular top-view shape. An optical field distribution of the optical signal is substantially defined by the basic part 12 of the optical waveguide 10, and is not affected by the frontmost end-part 14. Accordingly, even when a width of the end surface 18 is zero to thereby suppress a residual reflection, the optical coupling efficiency can be optimized independently.

As described above, the optical coupling element according to the present embodiment, both the effective suppression of a residual reflection and an optimum optical coupling efficiency can be realized at once.

As an example of a preferred method for fabricating the optical coupling element according to the present embodiment will be explained with reference to FIGS. 3A–3C.

First, an InGaAsP layer 32 having a 200 nm-thick and a 1.3 μm-bandgap wavelength equivalent composition, for example, is epitaxially grown on an InP substrate 30 by an MOVPE crystal growth method.

Then, an InP layer 34 is epitaxially grown on the InGaAsP layer 32 by same MOVPE method.

Next, a silicon dioxide film 36 is formed on the InP layer 34 by a CVD method (FIG. 3A).

Next, the silicon dioxide film 36 is patterned by lithography and etching in the shape of the optical waveguide 10 as shown in FIG. 1A.

Next, with the patterned silicon dioxide film 36 as mask, the InP layer 34 and the InGaAsP layer 32 are dry-etched to form a mesa with a core layer 38 out of the InGaAsP layer 32 (FIG. 3B).

Then, an InP layer 40 is epitaxially grown selectively around said mesa, forming an optical waveguide 10. InP layer 40 covers the side surfaces of the core layer 38.

Next, the silicon dioxide film is removed, and another InP layer is again grown to make the surface flat. Thus, a core layer 38 of InGaAsP and a clad 42 which is formed by the InP substrate 30 and the InP layers 34 and 40 and surrounding a core layer 38 are formed (FIG. 3C).

Thus, the optical coupling element shown in FIGS. 1A and 1B can be fabricated.

An optical coupling element having a 5 μm-tapered length of the frontmost end-part of the optical waveguide and a 0.8 μm-width of the end surface was fabricated by the above-described fabrication method. An optical coupling element without frontmost end part could have a reflectivity at the end of the optical waveguide, which was reduced by above about one order of magnitude.

As described above, according to the present embodiment, the steep tapered region which does not affect the optical coupling efficiency is provided at the end part of the optical waveguide, whereby the effective suppression of a residual reflection and optimization of the optical coupling efficiency can be concurrently realized.

A Second Embodiment

The optical coupling element according to a second embodiment of the present invention will be explained with reference to FIGS. 4 to 6. The same members of the present embodiment as those of the optical coupling element and the method for fabricating the same according to the first embodiment shown in FIGS. 1A–1B, 2A–2B, and 3A–3C are represented by the same reference numbers not to repeat and to simplify their explanation.

Figure 4:
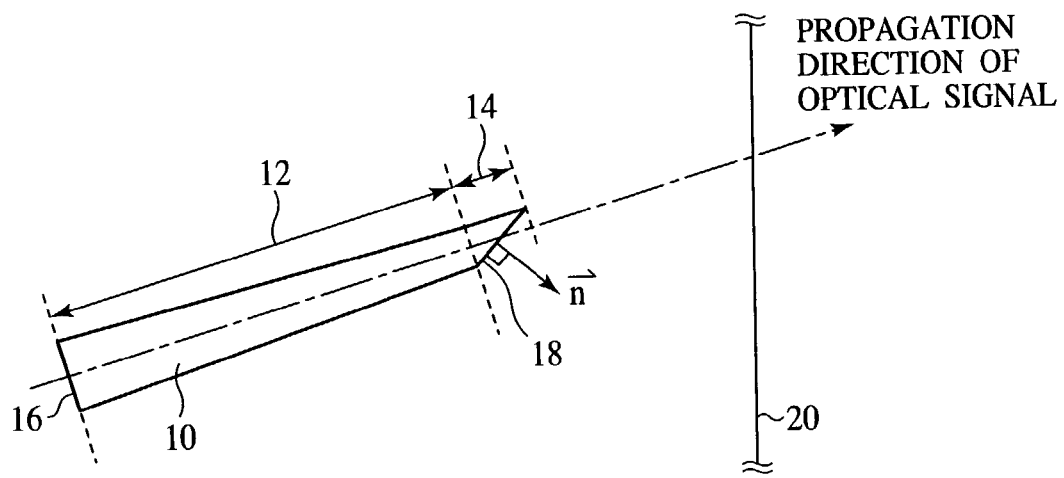
FIG. 4 is a top view of the optical coupling element according to a second embodiment of the present invention, which shows a structure thereof.

FIG. 4 is a top view of the optical coupling element according to the present embodiment, which shows a structure thereof. FIG. 5 is a contour plot showing a relationship between the width and the angle of an end surface 18 of an optical waveguide 10, and the reflectivity back into waveguide 10 given by simulation. FIG. 6 is a structure used in the simulation involved in FIG. 5.

The optical coupling element according to the present embodiment is the same in basic principle as the optical coupling element according to the first embodiment. As shown in FIG. 4, the optical coupling element according to the present embodiment is characterized mainly in that a frontmost end-part 14 of an optical waveguide 10 is asymmetrically tapered, and the central axis of the optical waveguide 10 intersects one side surface of the optical waveguide 10.

The frontmost end-part 14 is thus tapered, whereby an angle formed by a normal vector n of the side surface which is the end surface 18 and a vector of the propagation direction of optical signal can be large, and the residual reflection can be further suppressed.

To be more specific, it is preferable that an angle formed by a normal vector n on the side surface which is the end surface and a vector aligned with the propagation direction of the optical signal is larger than an angle α formed by a normal vector of the chip facet 20 and a vector of a propagation direction of optical signal. The frontmost end-part is thus tapered, whereby the residual reflection can be effectively suppressed.

Figure 5:
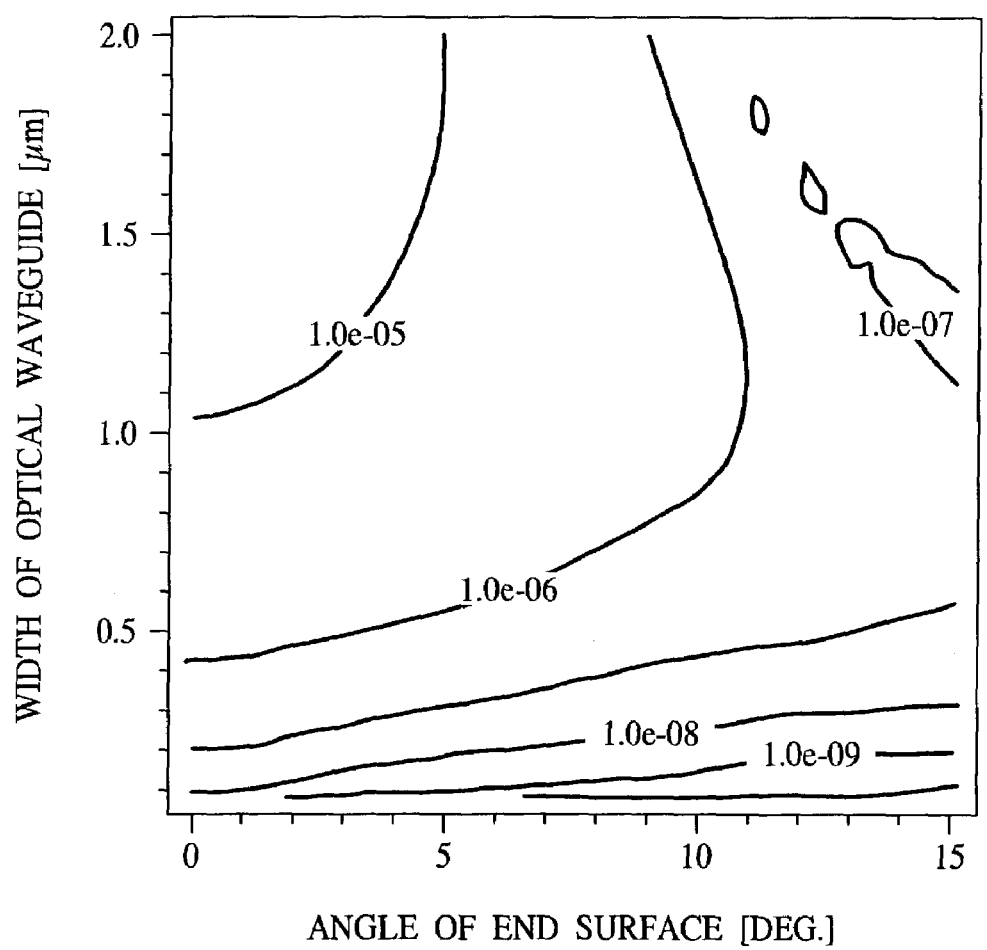
FIG. 5 is a graph of relationships between the width and the angle of the end surface of the optical waveguide, and the reflectivity given by simulation.
Figure 6:
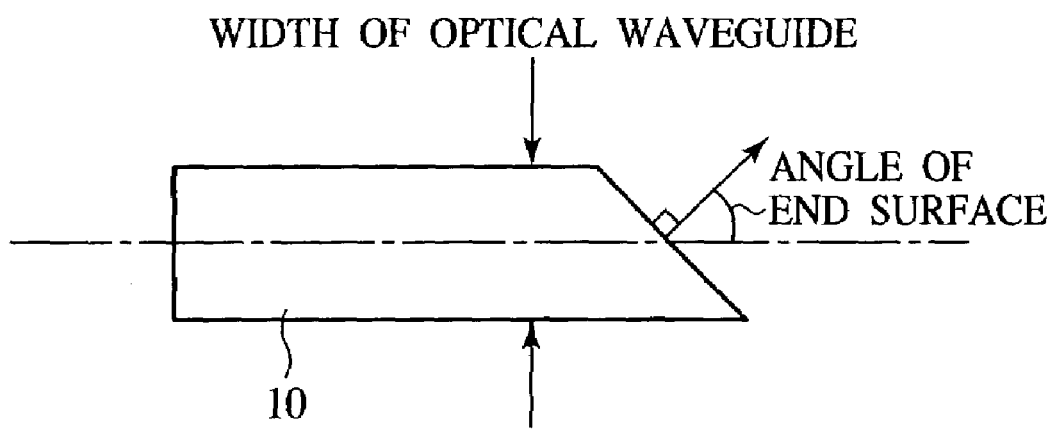
FIG. 6 is a view of the structure used in the simulation involved in FIG. 5.

As shown by FIG. 5, it is found that at a given angle of the end surface the reflectivity decreases as a width of the optical waveguide decreases. It is found that at a given width of the optical waveguide the reflectivity decreases as an angle of the end surface increases. For example, when a width of the optical waveguide is 0.1 μm, the reflectivity can be decreased by about 2 orders of magnitude when an angle of the end surface is increased to about 15°.

As described above, according to the present embodiment, the frontmost end-part is asymmetrically tapered to make an angle formed by the normal vector of the end surface and a vector aligned with the propagation direction of optical signal large, whereby a residual reflection can be further effectively suppressed.

A Third Embodiment

The optical device according to a third embodiment of the present invention will be explained with reference to FIG. 7.

Figure 7:
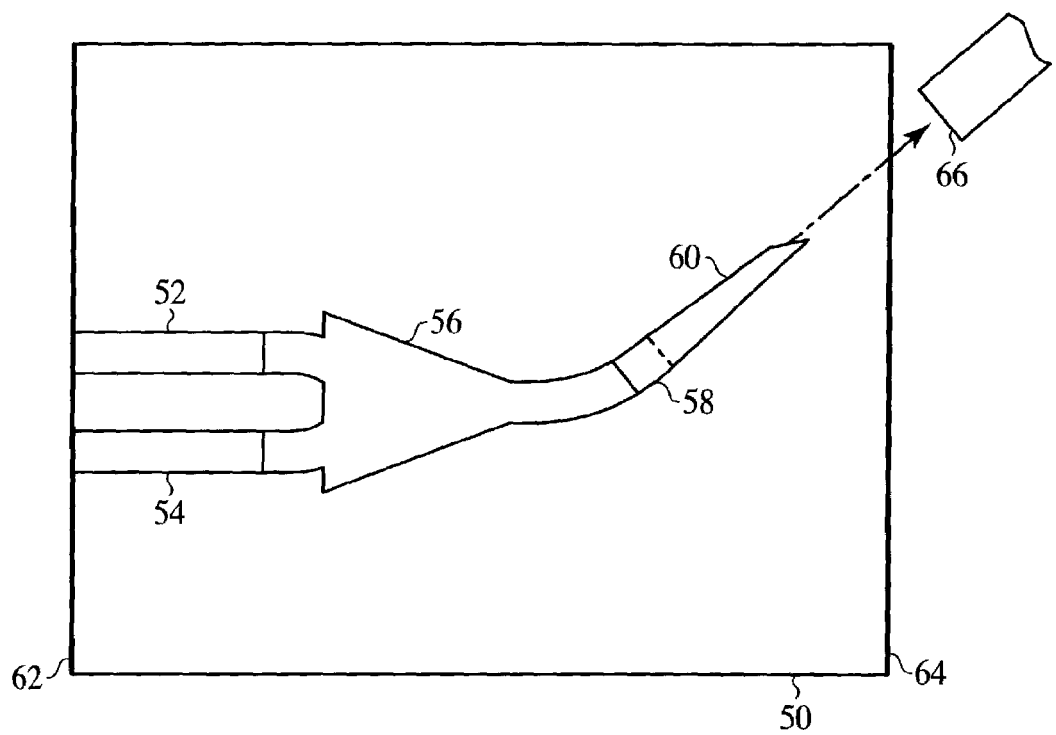
FIG. 7 is a top view of the optical device according to a third embodiment of the present invention, which shows a structure thereof.

FIG. 7 is a top view of the optical device according to the present embodiment, which shows a structure thereof. In FIG. 7 waveguides with active cores and waveguides with passive cores which are both regions for transmitting an optical signal under certain preferred conditions are shown.

On a substrate 50 there are formed two distributed feedback semiconductor lasers 52, 54, a combiner 56 which forms laser beams emitted by the distributed feedback lasers 52, 54 into a single coaxial beam, and a semiconductor optical amplifier 58 which amplifies said combined beam from the combiner. The optical coupling element 60 according to the second embodiment is connected to the output end of the semiconductor optical amplifier 58. Anti-reflection films 62, 64 are formed respectively on the laser end surface and the output coupling end surface of a chip on which these elements are formed. An optical fiber 66 is disposed adjacent to the substrate 50 and is optically connected to the optical coupling element 60.

As described above, the optical device according to the present embodiment, which couples and amplifies laser beams emitted by the two distributed feedback semiconductor lasers 52, 54 and outputs the coupled and amplified beams is characterized mainly in that the optical coupling element 60 according to the second embodiment is disposed on the output end of the semiconductor optical amplifier 58.

For optical devices including active elements, such as semiconductor optical amplifiers, semiconductor lasers, etc., it is especially important to suppress reflectivities near the chip facet. In the semiconductor optical amplifiers not only optical signal to be amplified but also light reflected on the end surface are amplified to resultantly often cause ripples in wavelength dependency of optical gains. Accordingly, it is more necessary for optical amplifiers of higher amplification factors to suppress the reflection on the end surface.

As in the optical device according to the present embodiment, the optical coupling element 60 according to the second embodiment is disposed on the output end of the semiconductor optical amplifier 58, whereby the reflection near the chip facet is effectively suppressed. Accordingly, the optical device can have high performances.

The distributed feedback semiconductor lasers 52, 54, the combiner 56 and the semiconductor optical amplifier 58 can respectively have known structures. The anti-reflection films 62, 64 can be formed of, for example 270 nm-thick silicon dioxide films.

In the optical device according to the present embodiment, it is possible that the optical coupling element 60 is a part of the semiconductor optical amplifier 58.

As described above, according to the present embodiment, the optical coupling element according to the second embodiment is disposed on the output end of the optical device, whereby the optical device can have little residual reflection and high performance.

A Fourth Embodiment

The optical device according to a fourth embodiment of the present invention will be explained with reference to FIG. 8.

Figure 8:
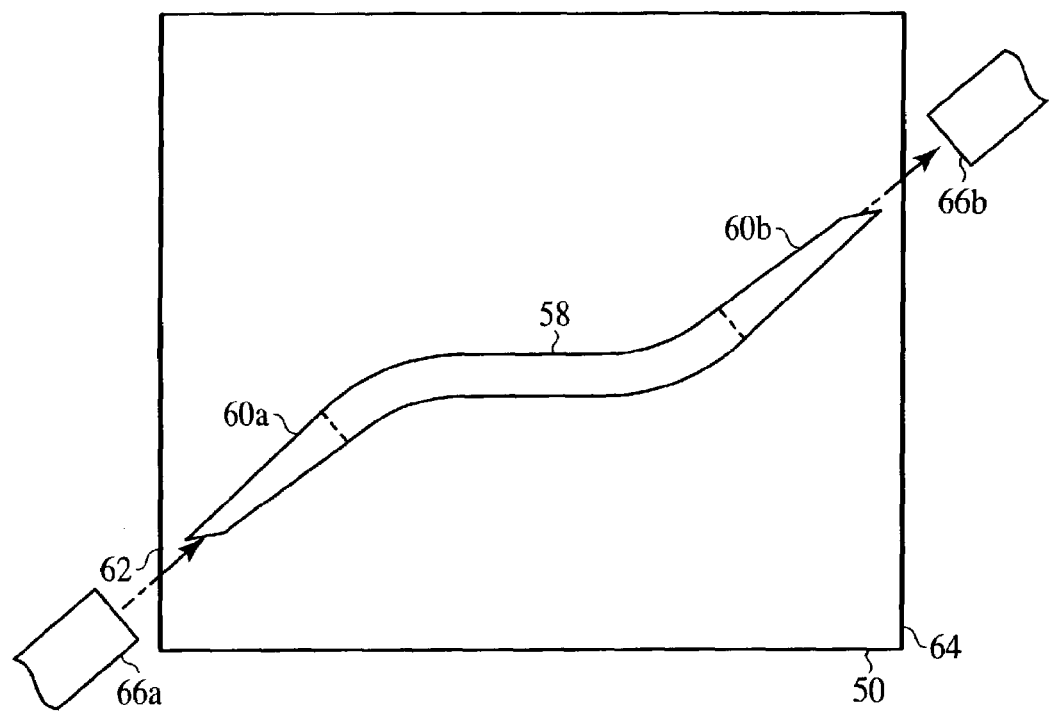
FIG. 8 is a top view of the optical device according to a fourth embodiment of the present invention, which shows a structure thereof.
Figure 9A:
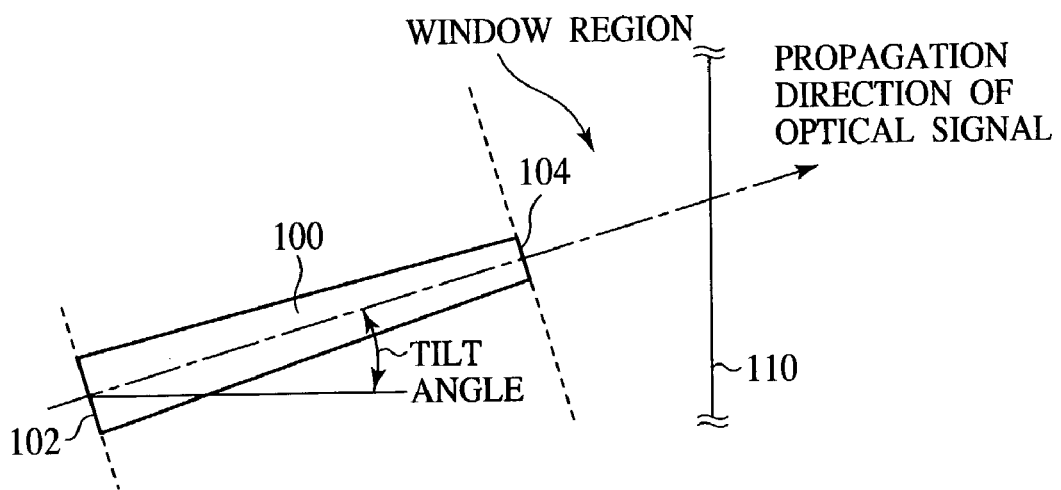
FIGS. 9A and 9B are views of the conventional optical coupling element, which show its structure and problem.
Figure 9B:
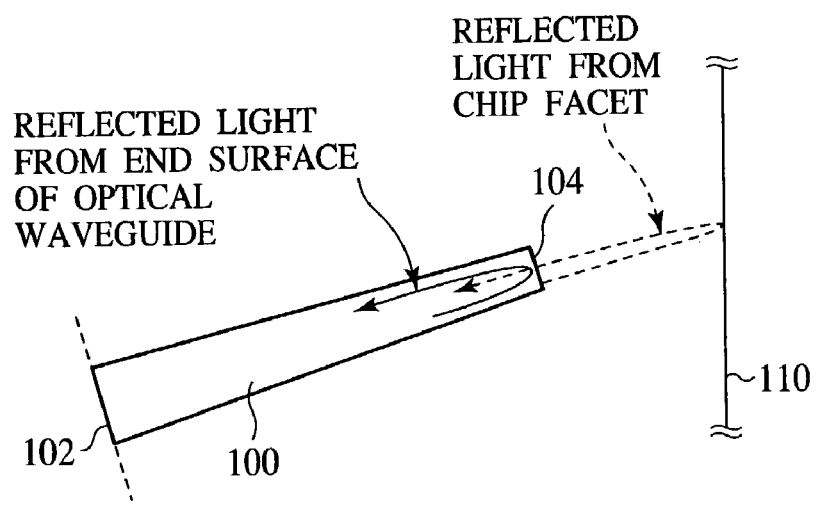

FIG. 8 is a top view of the optical device according to the present embodiment, which shows a structure thereof. In FIG. 8 waveguides with active cores and waveguides with passive cores which are both regions for transmitting an optical signal under certain preferred conditions are shown.

A semiconductor optical amplifier 58 is formed on a substrate 50. The optical coupling elements 60a, 60b according to the second embodiment are disposed respectively on a first coupling end and on a second coupling end of said semiconductor optical amplifier. Anti-reflection films 62, 64 are formed on the respective first end surface and second end surface of the chip where said semiconductor optical amplifier 58 is formed on. Optical fibers 66a and 66b are disposed adjacent to the substrate 50 and are optically connected to the optical coupling elements 60a and 60b, respectively.

As described above, the optical device according to the present embodiment, which amplifies incident optical signal on said first end of the semiconductor optical amplifier 58 and outputs the amplified optical signal on said second end is characterized in that the optical coupling elements 60 according to the second embodiment are disposed respectively on said first end and said second end of the semiconductor optical amplifier 58. The optical coupling element according to the second embodiment is disposed on the input end as well, whereby the reflection at the output end surface can be effectively suppressed, and the re-reflection of the reflected light on the input end surface can be also suppressed. Accordingly, the optical device can have high performances.

In the optical device according to the present embodiment, it is possible that the optical coupling element is a part of the semiconductor optical amplifier 58. Alternatively, the entire waveguide may be fabricated with an active waveguide core.

As described above, according to the present embodiment, the optical coupling elements according to the second embodiment are disposed respectively on the input end and the output end of the optical device, whereby the optical device can have little residual reflection and have high performances.

Modifications

The present invention is not limited to the above-described embodiments and can cover other various modifications.

For example, no anti-reflection film is provided on the chip facet in the first and the second embodiments, but anti-reflection films may be provided.

In the first to the fourth embodiments, a window structure is provided on the output end of the optical waveguide but is not essential. As long as the reflection on the chip facet is insignificant or can be sufficiently suppressed by anti-reflection film or other means, the window structure may not be provided. Similarly, the optical waveguide may not be arranged so that a propagation direction of optical signal is tilted from a normal direction of the chip facet.

The reflected light causing a residual reflection contains light reflected at the chip facet, and light reflected at the end surface of the optical waveguide. However, the present invention aims at suppressing the reflection mainly at the optical waveguide end surface and suppressing this lights coupling back into the waveguide. On the other hand, the anti-reflection film, the window structure and the tilted structure of the optical waveguide are aim at suppressing the reflection mainly at the chip facet and the coupling of reflected light in the optical waveguide. Accordingly, without using them, the structure of the present invention can suppress the reflection on the end surface of the optical waveguide. In terms of generally suppressing the reflection, it is preferable to combine these structures.

In the first and the second embodiments, the optical coupling element has two stages of tapers which linearly change a width of the optical waveguide. However, the two-stage taper, which linearly changes a width of the optical waveguide, is not essential. For example, in place of providing the steep tapered region on the frontmost end-part, the frontmost end-part may be rounded, and in this case as well, a width of the frontmost end-part can be defined as in FIG. 2A.

In the third embodiment, laser beams emitted by the two distributed feedback semiconductor lasers are coupled and amplified to output the amplified laser beam, and in the fourth embodiment, incident light is amplified by the semiconductor optical amplifier to output the amplified light. Optical devices the present invention can be applied to are not limited to the embodiments described above. The present invention is applicable widely to optical devices having structure for optically connecting the optical element to the optical transmitting element, such as optical fibers, etc.

In the third and the fourth embodiments, the optical coupling element according to the second embodiment is used, but the optical coupling element according to the first embodiment shown in FIGS. 1A, 2A or 2B may be used.

In the fourth embodiment, the optical coupling elements of the same structure are provided on the input end and the output end of the semiconductor optical amplifier 58, but the optical coupling elements on the input end and the output end may have structures different from each other.

Materials forming the optical coupling element are not limited to the material groups described in the above-described embodiments and can be suitably selected out of suitable material groups, based on wavelengths of optical signal, etc.

What is claimed is:

1. An optical coupling element for optically coupling an optical element formed on a substrate to an external optical element disposed adjacent to the substrate, comprising:

a first optical waveguide formed on the substrate and having a width on a side of the external optical element smaller than a width on a side of the optical element, the width of the first optical waveguide being tapered toward the side of the external optical element in a first degree; and a second optical waveguide formed on the substrate and connected to the first optical waveguide on the side of the external optical element, and having a width on a side of the external optical element less than half of a width on a side of the optical element, and having a shorter length than a length corresponding to 20 wavelengths of an optical signal, the width of the second optical waveguide being tapered toward the side of the external optical element in a second degree, steeper than the first degree.

2. An optical coupling element according to claim 1, wherein the first optical waveguide and the second optical waveguide are linearly tapered.

3. An optical coupling element according to claim 1, wherein an optical field distribution of the optical signal propagating through the second optical waveguide is substantially constant in shape over the second optical wave guide between an end surface on the side of the external optical element and an end surface on the side of the optical element.

4. An optical coupling element according to claim 1, wherein the first optical waveguide transforms an optical field distribution so that an optical field width of the optical signal outputted from the optical element is substantially equal to an optical field width of optimum acceptance of the external optical element.

5. An optical coupling element according to claim 1, wherein the first optical waveguide transforms an optical field distribution so that an optical field width of the optical signal outputted from the external optical element is substantially equal to an optical field width of optimum acceptance of the optical element.

6. An optical coupling element according to claim 1, wherein the second optical waveguide is formed in substantially triangular top-view shape.

7. An optical coupling element according to claim 1, wherein side surfaces of the second optical waveguide are tapered asymmetrically to a propagation direction of the optical signal, and the propagation direction of the optical signal intersects one of the side surfaces.

8. An optical coupling element according to claim 1, wherein the second optical waveguide has an end surface on the side of the external optical element rounded.

9. An optical coupling element according to claim 1, wherein a propagation direction of the signal light propagating through the optical coupling element and a normal vector of an end surface of the substrate form a prescribed angle larger than 0°.

10. An optical coupling element according to claim 9, wherein an angle formed by a normal vector of the end surface of the second optical waveguide for the optical signal propagating through and the normal vector of the end surface of the substrate is larger than a prescribed angle.

11. An optical coupling element according to claim 1, wherein an end surface of the second optical waveguide on the side of the external optical element is spaced from an end surface of the substrate.

12. An optical coupling element according to claim 1, further comprising:
an anti-reflection film formed on an end surface of the substrate.

13. An optical device comprising:
an optical amplifier formed on a substrate; and
an optical coupling element formed on the substrate and optically connected to one end of the optical amplifier,
the optical coupling element including: a first optical waveguide connected at one end surface to the optical amplifier, and having a width on the other end surface smaller than a width on said one end surface, the width of the first optical waveguide being tapered toward said other end surface in a first degree; and a second optical waveguide connected one end surface to said one end surface of the first optical waveguide, having a width on the other end surface less than half of a width on said one end surface, and having a shorter length than a length corresponding to 20 wavelengths of an optical signal, the width of the second optical waveguide being tapered toward said other end surface in a second degree, steeper than the first degree.

14. An optical device comprising:
an optical amplifier formed on a substrate;
a first optical coupling element formed on the substrate and optically connected to one end of the optical amplifier; and
a second optical coupling element formed on the substrate and optically connected to another end of the optical amplifier,
each of the first optical coupling element and the second optical coupling element including: a first optical waveguide connected at one end surface to the optical amplifier, and having a width on the other end surface smaller than a width on said one surface, the width of the first optical waveguide being tapered toward said other end surface in a first degree; and a second optical waveguide connected one end surface to said one end surface of the first optical waveguide, having a width on the other end surface less than half of a width on said one end surface, and having a shorter length than a length corresponding to 20 wavelengths of an optical signal, the width of the second optical waveguide being tapered toward said other end surface in a second degree, steeper than the first degree.

15. An optical device comprising:
an optical amplifier formed on a substrate;
an optical coupling element formed on the substrate and optically connected to the optical amplifier, and
an external optical element disposed adjacent to the substrate and optically connected to the optical coupling element,
the optical coupling element including: a first optical waveguide having a width on a side of the external optical element smaller than a width on a side of the optical amplifier, the width of the first optical waveguide being tapered toward the side of the external optical element in a first degree; and a second optical waveguide connected to the first optical waveguide on the side of the external optical element, and having a width on a side of the external optical element less than half of a width on a side of the optical amplifier and having a shorter length than a length corresponding to 20 wavelengths of an optical signal, the width of the second optical waveguide being tapered toward the side of the external optical element in a second degree, steeper than the first degree.

16. An optical device comprising:
an optical amplifier formed on a substrate;
a first optical coupling element formed on the substrate and optically connected to one end of the optical amplifier;
a second optical coupling element formed on the substrate and optically connected to another end of the optical amplifier;
a first external optical element disposed adjacent to the substrate and optically connected to the first optical coupling element; and
a second external optical element disposed adjacent to the substrate and optically connected to the second optical coupling element,
each of the first optical coupling element and the second optical coupling element including: a first optical waveguide having a width on a side of the external optical element smaller than a width on a side of the optical amplifier, the width of the first optical waveguide being tapered toward the side of the external optical element in a first degree; and a second optical waveguide connected to the first optical waveguide on the side of the external optical element, and having a width on a side of the external optical element less than half of a width on a side of the optical amplifier and having a shorter length than a length corresponding to 20 wavelengths of an optical signal, the width of the second optical waveguide being tapered toward the side of the external optical element in a second degree, steeper than the first degree.

* * * * *